United States Patent [19]
Fujikura et al.

[11] Patent Number: 5,302,355
[45] Date of Patent: Apr. 12, 1994

[54] EXHAUST PURIFYING DEVICE AND METHOD OF PRODUCING THE SAME

[75] Inventors: Toshikazu Fujikura; Shin-ichi Nigorikawa, both of Saitama, Japan

[73] Assignee: Sankei Giken Kogyo Kabushiki Kaisha, Tokyo, Japan

[21] Appl. No.: 21,236

[22] Filed: Feb. 23, 1993

[30] Foreign Application Priority Data

Feb. 28, 1992 [JP] Japan ........................... 4-009707[U]

[51] Int. Cl.$^5$ ..................... B01D 53/36; F01N 3/28
[52] U.S. Cl. ..................... 422/180; 422/177; 60/299; 502/527; 502/439; 29/890; 29/890.08
[58] Field of Search .............. 422/171, 177, 178, 180; 55/DIG. 30, 520, 521, 525; 60/299; 502/527; 29/890, 890.08, 469

[56] References Cited

U.S. PATENT DOCUMENTS

| | | | |
|---|---|---|---|
| 4,576,800 | 3/1986 | Retallick | 422/180 |
| 4,719,680 | 1/1988 | Cyron | 422/180 |
| 4,976,103 | 12/1990 | Takikawa et al. | 422/180 |
| 4,988,483 | 1/1991 | Usui et al. | 422/180 |
| 5,094,821 | 3/1992 | Hitachi et al. | 422/180 |
| 5,130,100 | 7/1992 | Serizawa | 422/180 |

FOREIGN PATENT DOCUMENTS 1-163437 11/1989 Japan .

Primary Examiner—Robert J. Warden
Assistant Examiner—Hien Tran
Attorney, Agent, or Firm—Birch, Stewart, Kolasch & Birch

[57] ABSTRACT

In an exhaust purifying device for an internal combustion engine, a honeycomb core is constituted by a single webbing which is implemented as foil of stainless steel. The webbing is made up of a flat portion and a corrugated portion adjoining each other in the longitudinal direction of the webbing. The flat portion is held by a core metal forming part of a jig at a particular position which is a predetermined distance remote from a position where the corrugated portion begins. The core metal is rotated about its own axis in such a direction that the flat portion underlies the corrugated portion. As the core metal is rotated, the flat portion forms a core portion around the core metal. Thereafter, the corrugated portion and flat portion are sequentially wound around the core metal while lying one above the other to thereby form the honeycomb core. The honeycomb core is received in a casing to be attached to the exhaust system of the engine.

10 Claims, 5 Drawing Sheets

EXHAUST PURIFYING DEVICE AND METHOD OF PRODUCING THE SAME

BACKGROUND OF THE INVENTION

1. Field of the Invention

The present invention relates to an exhaust purifying device for purifying exhaust gases emanating from an internal combustion engine, and a method of producing the same and, more particularly, to an exhaust purifying device of the type having a core provided with a honeycomb structure and applied with a catalyst, and a method of producing the same.

2. Description of the Related Art

It is a common practice with an internal combustion engine, e.g., an automotive internal combustion engine to attach an exhaust purifying device or so-called catalytic converter to an exhaust pipe or a muffler forming part of the exhaust system of the engine. The catalytic converter promotes the oxidation of exhaust gases emanating from the engine to reduce carbon monoxide, hydrocarbons and other toxic components contained therein. Typical of conventional catalytic converters is one having a metallic casing and a metallic core received in the casing and provided with a honeycomb structure. The casing is attached to the exhaust system of the engine as, for example, part of an exhaust pipe or part of a muffler.

Specifically, the core of a catalytic converter mounted on an automobile has a flat metallic sheet and a corrugated metallic sheet overlying the flat sheet. The two sheets are held by a metal core and then sequentially rolled up together to form a spiral honeycomb structure. However, the problem with such a structure is that the two sheets are likely to shift relative to each other when initially being wrapped around the metal core. The relative shift of the sheets directly translates into deformation of the honeycomb structure, i.e., it is likely that the honeycomb core suffers from critical structural defects including collapsed corrugations and gaps. Such defects potentially constitute a cause of irregular strain in the honeycomb core. When the core having such defects is applied to a motorcycle or similar automotive vehicle, it comes apart, gets out of shape or otherwise deforms due to aging. This not only aggravates the structural defects but also often lowers the purifying ability of the catalytic converter.

In light of the above, Japanese Utility Model Laid-Open Publication No. 163437/1989 discloses a catalytic converter having a honeycomb core produced by abutting the end of a corrugated sheet and that of a flat sheet, connecting the abutting ends by spot welding or similar technology. Although this scheme eliminates or at least reduces the problems particular to the above-described conventional core, it is not practical without resorting to two different kinds of sheets, i.e., the corrugated sheet and flat sheet and, moreover, an extra spot welding step. In addition, delicate and troublesome work is needed for the two sheets to be abutted and affixed together in accurate alignment. Should the two sheets be brought out of alignment, the resulting honeycomb core would have an auger-like or similar incomplete configuration.

SUMMARY OF THE INVENTION

It is, therefore, an object of the present invention to provide an exhaust purifying device which is reliable and, in addition, reduces the number of parts and the number of production steps.

It is another object of the present invention to provide a method of producing such an exhaust purifying device.

In accordance with the present invention, an exhaust purifying device for promoting oxidation of an exhaust emanating from an internal combustion engine comprises a casing, and a core received in the casing and provided with a honeycomb structure. The core is constituted by a single webbing having a flat portion and a corrugated portion adjoining each other in the longitudinal direction of the webbing. The single webbing is wound in a predetermined plurality of turns around a widthwise axis of the flat portion which is located substantially intermediate between opposite ends of the single webbing.

Also, in accordance with the present invention, a method of producing an exhaust purifying device for promoting oxidation of an exhaust emanating from an internal combustion engine comprises the steps of preparing a single webbing having a flat portion and a corrugated portion adjoining each other in the longitudinal direction of the webbing, holding the flat portion at a particular position which is a predetermined distance remote from a position where the corrugated portion begins by a core metal, forming a honeycomb core by rotating the metal core to wind the single webbing in a predetermined plurality of turns around a widthwise axis of the flat portion which is located substantially intermediate between opposite ends of the single webbing, and inserting the honeycomb core in and affixing it to a casing.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

To better understand the present invention, a brief reference will be made to a prior art exhaust purifying device or catalytic converter, particularly a core thereof, shown in FIG. 9. As shown, the core is made up of a flat metallic sheet 32 and a corrugated metallic sheet 34 overlying the flat sheet 32. The two sheets 32 and 34 are held by a metal core 82 and then sequentially rolled up together to form a spiral honeycomb structure.

Figure 9:
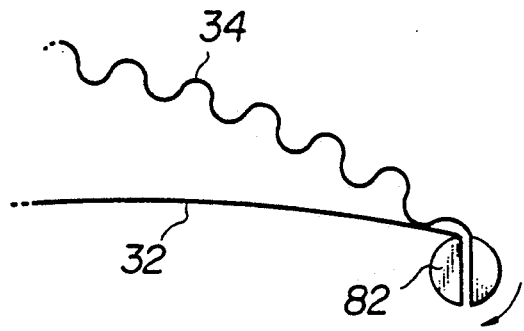
FIG. 9 is a side elevation indicative of a conventional procedure for forming a honeycomb core of an exhaust purifying device.
Figure 10:
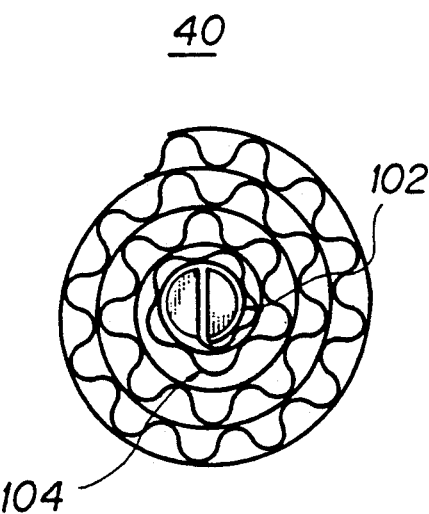
FIG. 10 is a side elevation showing the honeycomb core fabricated by the conventional procedure.

The problem with the structure shown in FIG. 9 is that the flat sheet 32 and corrugated sheet 34 are likely to shift relative to each other when being initially wrapped around the metal core 82. The relative shift of the sheets 32 and 34 directly translates into the deformation of the honeycomb structure. Specifically, as shown in FIG. 10, it is likely that the honeycomb core suffers from critical structural defects including collapsed corrugations 102 and gaps 104. Such defects potentially constitute a cause of irregular strain in the honeycomb core. When the core having the defects shown in FIG. 10 is applied to a motorcycle or similar automotive vehicle, it comes apart, gets out of shape or otherwise deforms due to aging. This not only aggravates the structural defects but also often lowers the purifying ability of the catalytic converter.

Although a catalytic converter elaborated to eliminate the above problems is taught in Japanese Utility Model Laid-Open Publication No. 163437/1989, it brings about other problems, as discussed earlier.

Figure 1:
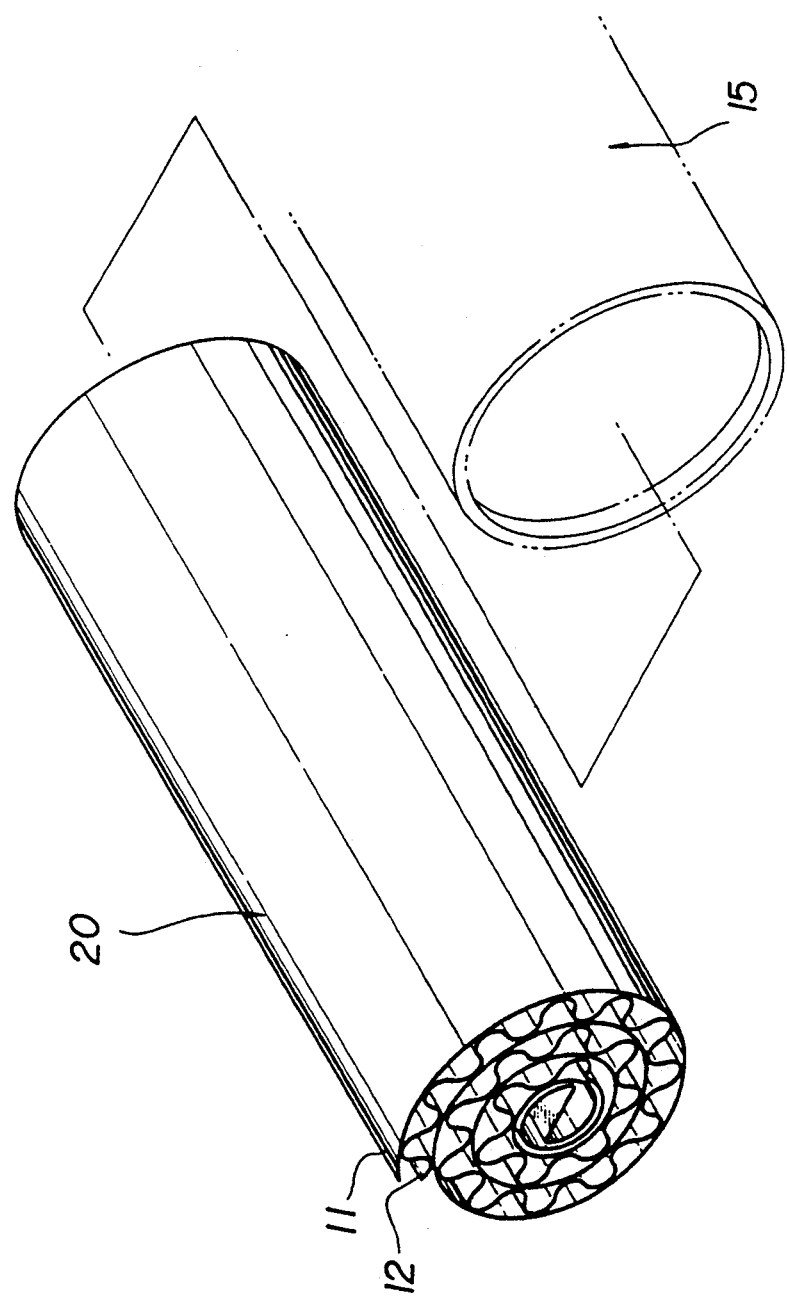
FIG. 1 is an exploded perspective view of an exhaust purifying device embodying the present invention.

Referring to FIG. 1, an exhaust purifying device or catalytic converter embodying the present invention is shown which is free from the drawbacks particular to the conventional implementations as stated above. As shown, the catalytic converter is generally made up of a casing 15 and a honeycomb core 20 received in the casing 15. The casing 15 forms part of the exhaust system of an automobile or similar automotive vehicle. Specifically, the casing 15 is made of stainless steel or similar metal and provided with a substantially cylindrical configuration and end cover portions. The casing 15 is welded or otherwise connected at one or both ends thereof to part of an exhaust system extending from an internal combustion engine, forming part of an exhaust passage. While the casing 15 is assumed to be cylindrical in the embodiment, it may, of course, have an elliptical cross-section, a partly curved rectangular cross-section or similar cross-section so long as it matches the configuration of the exhaust passage. The core 20 is implemented with a honeycomb structure having a spiral cross-section. In the honeycomb structure, a great number of exhaust passageways or cells are arranged in the radial and circumferential directions. A catalyst is applied or otherwise deposited on the inner surfaces of the exhaust passageways for promoting the oxidation of exhaust gases emanating from the engine. The catalyst may advantageously be comprised of platinum, rhodium, palladium or similar metal.

Figure 2:
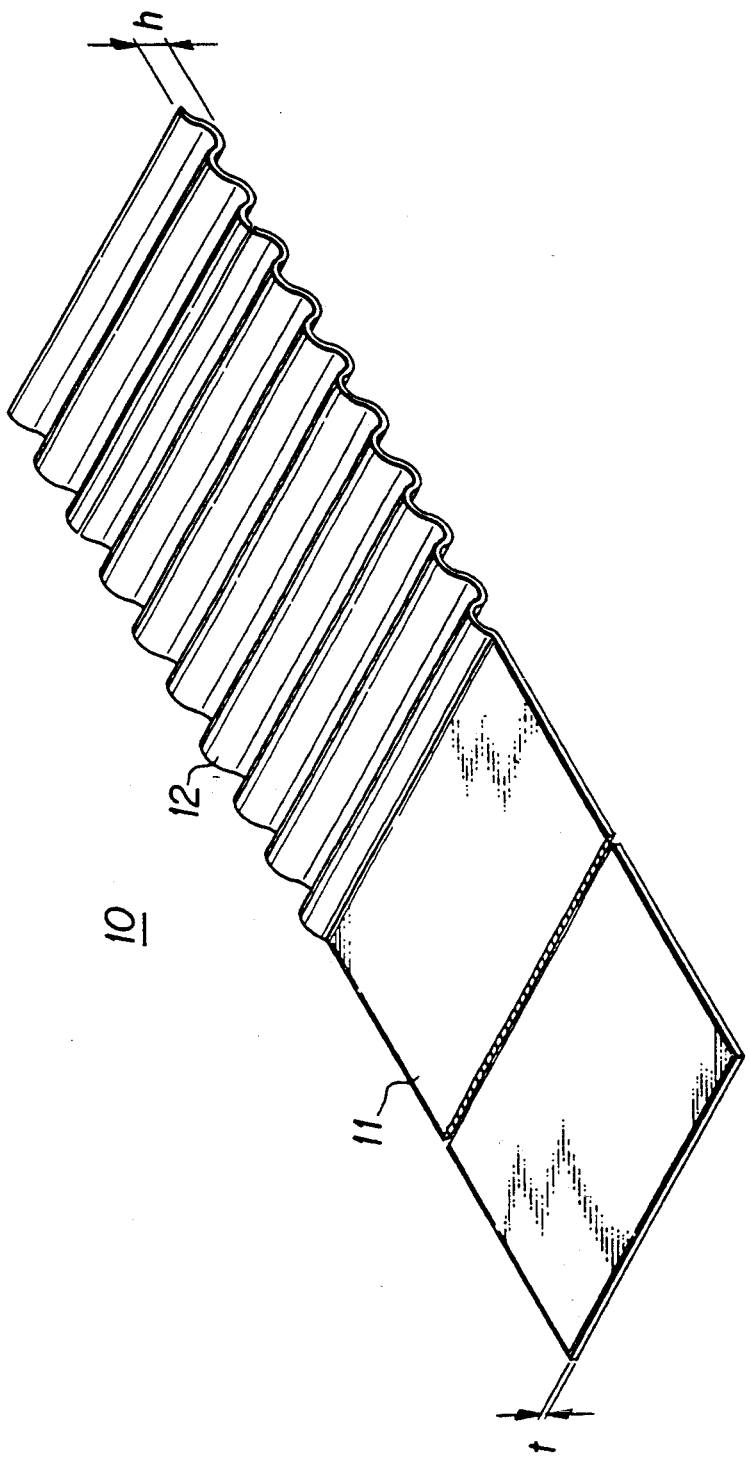
FIG. 2 is a perspective view of a single webbing for constituting a honeycomb core included in the embodiment.

Specifically, as shown in FIG. 2, the core 20 is formed by rolling up a single webbing 10 in a spiral configuration. The webbing 10 is made up of an elongate flat portion 11 and an elongate corrugated portion 12 which adjoin each other in the longitudinal direction of the webbing 10. The webbing 10 is implemented by foil of stainless steel having a thickness t of about 50 microns to about 100 microns. Therefore, the webbing 10 exhibits sufficient strength against the high-temperature and high-pressure exhaust from the engine, and it is flexible enough to be rolled up without bending or cracking. The flat portion 11 has a length greater than that of the corrugated portion 12 and great enough to form the honeycomb core 20. It is to be noted that the lengths of the flat portion 11 and corrugated portion 12 are variable in matching relation to the inside diameter and structure of the casing 15 as well as the purifying characteristic and other specifications of the product. In the illustrative embodiment, the core 20 is so configured as to be received in the casing 15. The outside diameter of the core 20 is generally determined by the height h of corrugations and the number of turns of the portion 12, and the diameter of a radially central portion or core portion 21 (see FIG. 8) which will be described in detail later.

Figure 3:
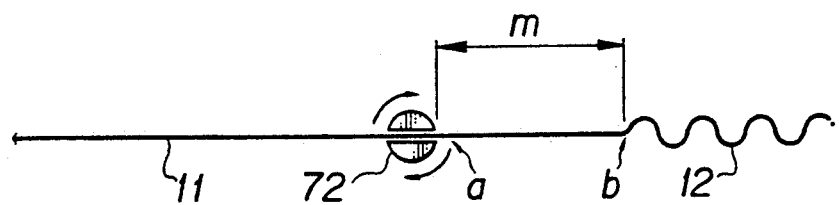
FIGS. 3-6 are side elevations demonstrating a sequence of steps for forming the honeycomb core of the embodiment.

FIGS. 3-6 show a sequence of steps for rolling up the webbing 10 to form the spiral honeycomb core 20. As shown, a metal core 72 forms part of a jig, not shown, for rolling the webbing 10. The metal core 72 is implemented as a cylindrical rod and formed with a slit along the center line thereof. The webbing or stainless steel foil 10 is passed through the slit of the metal core 72 until an intermediate portion between opposite ends thereof has been located at the metal core 72. Then, the metal core 72 is rotated about its own axis to form the honeycomb core 20. The outside diameter of the metal core 72 determines the inside diameter d (see FIG. 8) of the core 20. The inside diameter d is determined on the basis of the mechanical strength and outside diameter of the core 20 and various characteristics including the contact area of the exhaust with the walls of the core 20 and air resistance. As shown in FIG. 3, assume that the metal core 72 grips the flat portion 11 of the webbing 10 at a position a on the periphery thereof which is remote from a position b where the corrugated portion 12 begins by a distance m. This distance m is open to choice and dependent on the number of turns of the core portion 21 of the core 20. As FIG. 8 indicates, the core portion 21 of the core 20 is the radially central part of the core 20 formed only by the flat portion 11 when the webbing 10 is initially rolled by the metal core 72.

Figure 6:
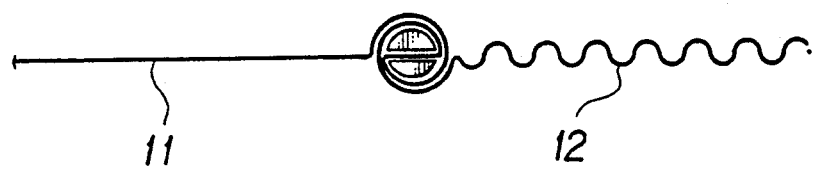
Figure 7:
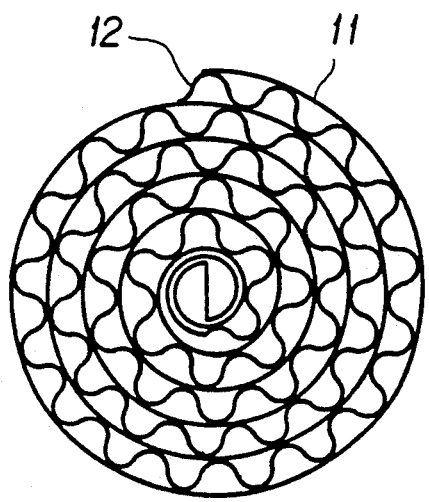
FIG. 7 is a section showing the honeycomb core formed by the procedure of FIGS. 3-6.
Figure 8:
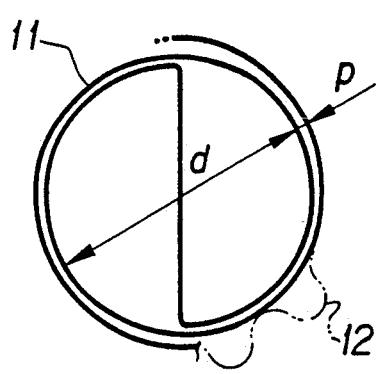
FIG. 8 is a fragmentary enlarged view showing a radially central portion or core portion included in the honeycomb core of FIG. 7.

As shown in FIG. 6, the core portion 21 of the honeycomb core 20 is constituted by a plurality of turns of the flat portion 11. As shown in FIG. 8, the core portion 21 has a thickness p which is determined by the thickness t of the webbing 10 and the number of turns of the flat portion 11 constituting the portion 21. The core portion 21 supports the honeycomb structure of the core 20 when the metal core or jig 72 is removed from the core 20. Also, the core 21 receives a pressure acting inward within the honeycomb structure itself, thereby preventing it from reaching the metal core 72. This allows the core metal 72 to be smoothly pulled out of the core 20 and, therefore, protects the core 20 from deformation when the metal core 72 is removed.

Figure 4:
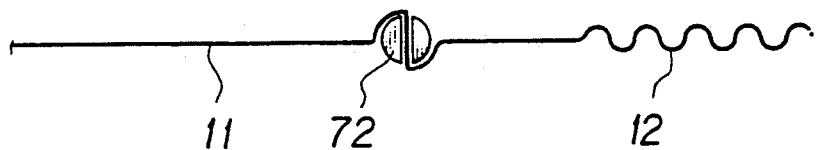
Figure 5:
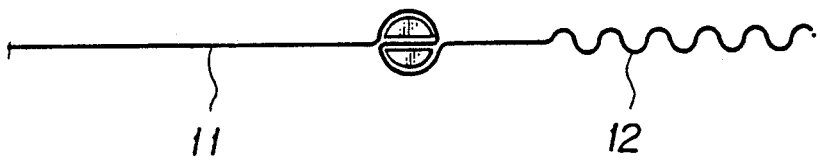

Formation of the core portion 21 and honeycomb structure will be described more specifically with reference to FIGS. 3-6. First, as shown in FIG. 3, the flat portion 11 of the webbing or foil 10 is gripped by the metal core or jig 72. The positional relation between the webbing 10 and the metal core 72, i.e., the previously mentioned distance m between the positions a and b is determined by the thickness p of the core 21 which is in turn determined by the above-stated factors. In the illustrative embodiment, the distance m is substantially equal to one turn, i.e., the circumference of the core metal 72 over which the webbing 10 wraps. The flat portion 11 and the corrugated portion 12 are respectively fed from the left and the right toward the metal core 72, as viewed in the figures, while being held under a particular degree of tension optimal for the formation of the honeycomb structure. Under the above conditions, as the metal core 72 is rotated clockwise as viewed in FIG. 3, it takes up the flat portion 11 to begin forming the core portion 21, as shown in FIG. 4. As the core metal 72 is rotated 180 degrees, right and left parts of the flat portion 11 form one turn of the core portion 21, as shown in FIG. 5. Further, when the core metal 72 is rotated 360 degrees, the two parts of the flat portion 11 from two turns of the core portion 21, as shown in FIG. 6. At this instant, the end b of the corrugated portion 12 adjoining the flat portion 11 reaches the core portion 21.

After the core portion 21 has been formed, the corrugated portion 12 and flat portion 11 are sequentially wound around the portion 21 while lying one above the other. At the time when a predetermined number of turns are completed around the core 21, the flat portion 11 has fully covered the corrugated portion 12 to constitute the outer periphery of the honeycomb core 20. A remaining part of the two portions 11 and 12, if any, is cut away before the end of the procedure. After the honeycomb core 20 has been produced by the above procedure, the metal core 72 is pulled out from the core 20. The core 20 is inserted into the cylindrical casing 15. Then, the flat portion 11 and corrugated portion 12 and the core 20 and casing 15 are soldered or otherwise connected together.

The catalytic converter produced by the above-described procedure has opposite ends of the casing welded or otherwise connected to, for example, an exhaust pipe of an automobile which terminates at a muffler. In this condition, the exhaust from an engine, not shown, enters the casing 15 accommodating the honeycomb core 20 via the exhaust pipe. Then, the exhaust is caused to flow through the honeycomb core 20 and emitted to the atmosphere via a rear exhaust pipe, not shown. At this instant, the catalyst applied to the core 20 oxidizes unburned exhaust gases, i.e., reduces carbon monoxide, hydrocarbons and other toxic components of the exhaust from the engine. It is noteworthy that the honeycomb structure of the core 20 is uniform enough to scatter the incoming engine exhaust in a regular distribution, thereby enhancing the purifying ability of the catalyst.

As stated above, in the illustrative embodiment, the single webbing 10 has both the flat portion 11 and the corrugated portion for constituting the honeycomb core 20, thereby reducing the number of constituent parts of the catalytic converter. Since the flat portion 11 is wound around the core metal 72 in two or more turns, the honeycomb core 20 is provided with a stable configuration. Hence, not only the metal core 72 can be smoothly pulled out from the core 20, but also the core 20 is protected from deformation despite the removal of the metal core 72. The stable configuration after the fabrication eliminates the need for a spiral forming operation using high tension and allows a minimum of structural defects, e.g., deformation of the corrugations to occur without resorting to a solder or similar measure for reinforcement. Consequently, the core 20 is free from the deterioration of characteristics and can be produced at an unprecedented yield. In addition, since the number of turns of the core portion 21, the outside diameter of the core metal 72 and so forth can be relatively freely changed, it is easy to produce various kinds of products by using the same webbing 10.

In summary, it will be sen that the present invention provides a catalytic converter which reduces the number of parts and cost and, in addition, achieves an unprecedented purifying ability and reliability.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, while the catalytic converter has been shown and described as being connected to an exhaust pipe, it may, of course, be bodily received in a muffler. The catalytic converter of the invention is applicable not only to an automobile but also to a motorcycle. While the honeycomb core 20 has been provided with a cylindrical configuration, the metal core 72 may have a cross-section other than a circle, e.g., an elliptical cross-section to provide the core 20 with a non-circular cross-section. It is to be noted that steps not directly relevant to the understanding of the present invention, e.g., the step of applying the catalyst to the core 20 have not been described specifically.

What is claimed is:

1. An exhaust purifying device for promoting oxidation of an exhaust emanating from an internal combustion engine, comprising:
   a casing including a cylindrical portion and end cover portions; and
   a core received in said casing and provided with a honeycomb structure;
   said core being made of a single webbing having a flat portion and a corrugated portion adjoining each other in a longitudinal direction of said webbing, said flat portion of said single webbing being wound a predetermined plurality of turns in the longitudinal direction of said single webbing thereby forming a core portion about which superposed layers of the flat and corrugated portions are wound.

2. The device as claimed in claim 1, wherein said flat portion of said webbing is wound at least one turn to form said core portion.

3. The device as claimed in claim 1, wherein one of said end cover portions is to be connected to an exhaust pipe extending from an internal combustion engine.

4. The device as claimed in claim 1, wherein said single webbing comprises a foil of stainless steel.

5. The device as claimed in claim 4, wherein said foil of stainless steel has a thickness of between 50 to 100 microns.

6. The device as claimed in claim 1, wherein said flat portion has a length greater than said corrugated portion.

7. A method of producing an exhaust purifying device for promoting oxidation of an exhaust emanating from an internal combustion engine, comprising the steps of:
   providing a single webbing having a flat portion and a corrugated portion adjoining each other in a longitudinal direction of said webbing;
   holding said flat portion with a metal core at a position which is a predetermined distance from a position where said corrugated portion begins;
   forming a honeycomb core by rotating the metal core to wind said single webbing a predetermined plurality of turns around said flat portion which is located substantially at an intermediate position between opposite ends of said single webbing thereby forming a core portion about which superposed layers of the flat and corrugated portions are wound;
   drawing the metal core from said honeycomb core; and inserting said honeycomb core in and affixing end cover portions to a casing.

8. The method as claimed in claim 7, wherein said flat portion of said webbing is wound at least one turn to form a radially central core portion.

9. The method as claimed in claim 7, further comprising the step of connecting end cover portions of said casing to a piece of pipe connectable to an exhaust pipe extending from an internal combustion engine.

10. The method as claimed in claim 7, wherein said single webbing is a foil of stainless steel.

* * * * *